(12) United States Patent
Surazhsky et al.

(10) Patent No.: US 10,540,784 B2
(45) Date of Patent: Jan. 21, 2020

(54) CALIBRATING TEXTURE CAMERAS USING FEATURES EXTRACTED FROM DEPTH IMAGES

(71) Applicant: Intel Corporation, Santa Clara, CA (US)

(72) Inventors: Vitaly Surazhsky, Yokneam Illit (IL); Michael Bronstein, Lugano (CH); Alex Bronstein, Haifa (IL); Aviad Zabatani, Even Yehuda (IL); Erez Sperling, D.N. Menashe (IL); Ohad Menashe, Haifa (IL); David Haim Silver, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/499,980

(22) Filed: Apr. 28, 2017

(65) Prior Publication Data

US 2018/0315213 A1 Nov. 1, 2018

(51) Int. Cl.
| | |
|---|---|
| G06K 9/00 | (2006.01) |
| G06T 7/80 | (2017.01) |
| G06T 7/55 | (2017.01) |
| G06T 7/521 | (2017.01) |
| G06T 7/40 | (2017.01) |
| G06K 9/03 | (2006.01) |
| G06K 9/62 | (2006.01) |

(Continued)

(52) U.S. Cl.
CPC ............... *G06T 7/80* (2017.01); *G06K 9/036* (2013.01); *G06K 9/6256* (2013.01); *G06T 7/40* (2013.01); *G06T 7/521* (2017.01); *G06T 7/55* (2017.01); *G06T 7/90* (2017.01); *G06K 9/4652* (2013.01); *G06K 9/6202* (2013.01); *G06T 2207/10024* (2013.01); *G06T 2207/10028* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 6,750,873 B1 * | 6/2004 | Bernardini | ............. G06T 15/04 345/581 |
| 9,467,680 B2 | 10/2016 | Kimmel et al. | |

(Continued)

*Primary Examiner* — Sean M Conner
(74) *Attorney, Agent, or Firm* — International IP Law Gropu P.L.L.C.

(57) ABSTRACT

An example apparatus for calibrating texture cameras includes an image receiver to receive a depth image from a depth camera and a color image from a texture camera. The apparatus also includes a feature extractor to extract features from the depth image and the color image. The apparatus further includes a feature tester to detect that the extracted features from the depth image and the color image exceed a quality threshold. The apparatus includes a misalignment detector to detect a misalignment between the extracted features from depth image and the extracted features from color image exceeds a misalignment threshold. The apparatus also further includes a calibrator to modify calibration parameters for the texture camera to reduce the detected misalignment between the extracted features from the depth image and the extracted features from the color image below a misalignment threshold.

20 Claims, 9 Drawing Sheets

(51) Int. Cl.
 *G06T 7/90* (2017.01)
 *G06K 9/46* (2006.01)

(56) References Cited

U.S. PATENT DOCUMENTS

| | | | |
|---|---|---|---|
| 2014/0363143 A1* | 12/2014 | Dharssi | G06K 9/00765 |
| | | | 386/282 |
| 2015/0172635 A1* | 6/2015 | Kimmel | H04N 13/246 |
| | | | 348/51 |
| 2015/0178956 A1* | 6/2015 | Davis | G06T 11/001 |
| | | | 345/582 |
| 2015/0262417 A1* | 9/2015 | Koroteev | G01N 33/24 |
| | | | 382/109 |
| 2016/0055237 A1* | 2/2016 | Tuzel | G06F 17/30707 |
| | | | 382/224 |
| 2016/0373727 A1 | 12/2016 | Kimmel et al. | |
| 2017/0280130 A1* | 9/2017 | Burton | G06T 7/97 |
| 2018/0174326 A1* | 6/2018 | Katchalov | G06T 7/80 |

* cited by examiner

100

400B

400A

700

CALIBRATING TEXTURE CAMERAS USING FEATURES EXTRACTED FROM DEPTH IMAGES

BACKGROUND

Depth camera systems may be used to measure distance from an object. For example, a depth camera system may include a projector and at least one camera. In such a system, the projector projects a known pattern image on an object, and an image of the object upon which the image is projected may be captured by the camera. From the captured images, depth information may be determined.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
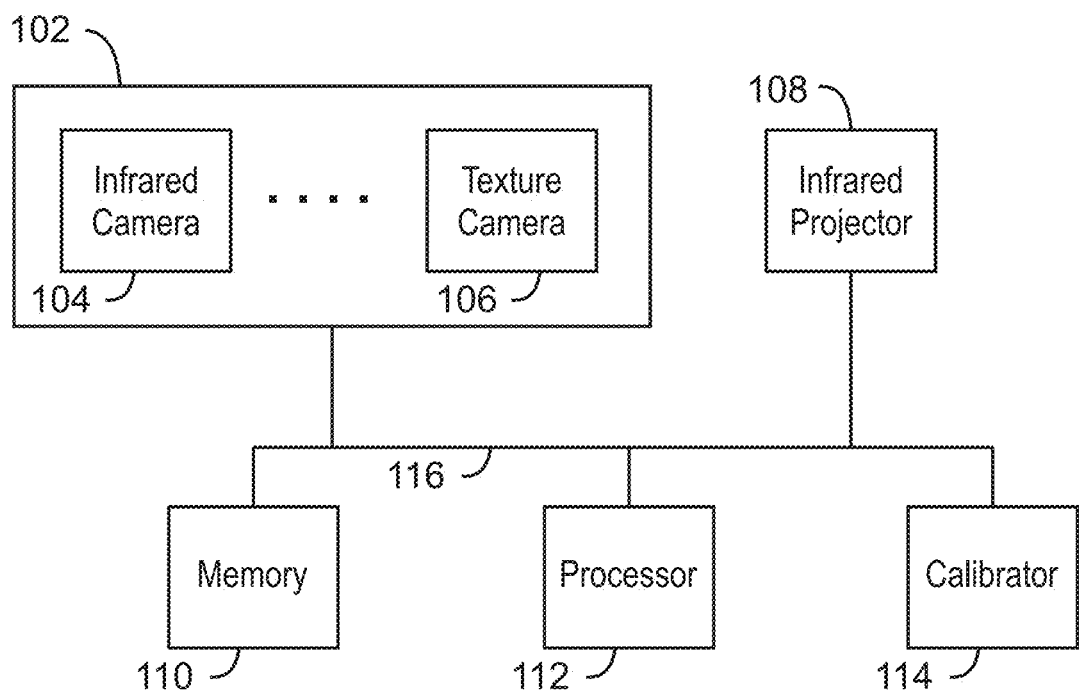
FIG. 1 is a block diagram illustrating an example triangulation-based system that can be calibrated using techniques described herein.

As describe above, depth camera systems may be used to measure distance from an object. One technique for determining depth in such devices is through the use of triangulation. Thus, images of objects are captured and measurements are taken to determine depth information. Triangulation-based systems may be dependent on an accurate calibration between the depth camera, the infrared camera, and the projector, to determine exact intrinsic and extrinsic parameters of such components. For example, the system may be calibrated at a factory using high resolution cameras and calibration equipment. In particular, high-quality texture mapping may depend highly on the calibration of the texture camera and infrared camera in such depth camera systems. However, due to mechanical tolerances and phenomena such as heating, aging, mechanical shock, among other phenomena, the intrinsic and extrinsic parameters of such components may tend to change over time and thus bring the system out of calibration and degrade image quality. Moreover, recalibration may be a long and expensive process. For example, recalibration may include the use of special equipment and skills, and is thus not generally performed by the consumer. Instead, recalibration may involve the system being shipped back to the manufacturer. In some examples, stringent mechanical tolerances may be used in triangulation-based systems to reduce prevent the components from decalibrating. However, such stringent mechanical tolerances may dramatically increase costs, including form factor costs.

The present disclosure relates generally to techniques for calibrating a depth camera system. Specifically, the techniques described herein include an apparatus, method and system for calibrating a depth camera system. An example apparatus includes an image receiver to receive a depth image from a depth camera and a color image from a texture camera of a depth camera system. The apparatus includes a feature extractor to extract features from the depth image and the color image. The apparatus further includes a feature tester to detect that the extracted features from the depth image and the color image exceed a quality threshold. The apparatus also includes a misalignment detector to detect a misalignment between the extracted features from depth image and the extracted features from color image exceeds misalignment threshold. The apparatus further includes a calibrator to modify calibration parameters for the texture camera to reduce the detected misalignment between the extracted features from the depth image and the extracted features from the color image below a misalignment threshold.

The techniques described herein thus enable for continuous and automatic calibration of texture cameras in depth camera systems. For example, the present techniques may be used to calibrate texture cameras to depth images at regularly defined intervals or in response to receiving a calibration request. In particular, no special equipment or procedures may be necessary for users to have or perform as in factory calibration of such depth camera systems. Moreover, the techniques may provide for targetless calibration. For example, the techniques described herein may be used to calibrate a texture camera with an infrared camera without using a calibration target, such as a target with a known size. Therefore, the techniques described herein may allow fully autonomous calibration. For example, the end user may not be aware that such a system performs any calibration. Moreover, the techniques described herein can be used by devices to maintain accuracy of texture camera calibration and reduce artifacts from images.

FIG. 1 is a block diagram illustrating an example triangulation-based system that can be calibrated using techniques described herein. The example system is referred to generally by the reference number 100 and can be implemented in the computing device 800 below in FIG. 8 using the method 700 of FIG. 7 below.

Referring to FIG. 1, the system 100 may include one or more image capturing devices 102, such as a digital camera 104 and a texture camera 106. For example, the texture camera 106 may be a red, green, and blue (RGB) camera. In some examples, the system 100 can include a 3D scanner, a 3D camera, or any other device configured for 3D object acquisition. The system 100 can also include a projector 108, such as a laser projector or laser scanner, having a number of components. In some examples, digital camera 104 may comprise an infrared (IR) camera 104, and the projector 108 may comprise an IR projector 108.

FIG. 1 illustrates one example of an active coded light triangulation system 100. In some examples, the system 100 may include coded light range cameras operating by projecting a sequence of one-dimensional binary ("black" and "white") patterns onto a scene, such that the produced binary code encodes the angle of the projection plane. Depth may then be reconstructed by triangulation consisting of computing the intersection of an imaginary ray emanating from the camera with the plane emanating from the projector 108.

In some examples, the infrared projector 108 can be configured to project an infrared light pattern as described above and may comprise a one-dimensional code projector 108. In some examples, the light patterns may be one-dimensional coded light patterns. For example, the patterns may be described by one-dimensional or linear codes. The light patterns formed by the laser planes on a surface of an object may be received by image capturing device 102 and sensed by a sensor of image capturing device 102. For example, the light patterns may be sensed by the infrared camera 104. Based on the readings of the multiple scans of the light patterns accumulated during a sensing cycle of the sensor, the system 100 may be configured to reconstruct the shape of the object.

In some examples, the image capture device 102 may further include another image capturing device, such as a texture camera 106. In some examples, the texture camera 106 may have a resolution that is different than that of infrared camera 104. For example, the texture camera 104 may be a multi-chromatic camera, such as red, green, and blue (RGB) camera configured to capture texture images of an object at a higher resolution. In some examples, the texture camera may be a high-definition (HD) camera.

The system 100 may further include a memory 110, processor 112, and calibrator 114, that may be in operative communication with the image capture device 102 over a bus or interconnect 116. In some examples, the processor 112 may include a standardized processor, a specialized processor, a microprocessor, or the like that may execute instructions that may include instructions for generating depth information, generating a depth image, or performing other operations described herein.

In some examples, the processor 112 may be configured to reconstruct the object based on the images captured by the infrared camera 104. For example, the processor 112 may reconstruct the object using geometry techniques or other techniques used for 3D image reconstruction. In some examples, the processor 112 may be further configured to dynamically calibrate the system 100 to correct distortions in the reconstructed image of the object that may be caused, for example, by various external factors. For example, the external factors may include temperature, etc.

In some examples, the memory 110 may store the instructions that may be executed by processor 112, images or frames of images captured by the cameras 104, 106, user profiles, or any other suitable information, images, or the like. For example, memory 110 may include random access memory (RAM), read only memory (ROM), cache, Flash memory, a hard disk, or any other suitable storage component. As shown in FIG. 1, the memory 110 may be a separate component in communication with the image capture device 102 and the processor 112. Alternatively, in some examples, the memory 110 may be integrated into the processor 112 or the image capturing device 101. In some examples, some or all of the components 102-112 may be located in a single housing.

In some examples, the processor 112, memory 110, other components (not shown), image capturing device 102, and projector 108 may be coupled with one or more interfaces (not shown) that may be configured to facilitate information exchange among the above-mentioned components. For example, communications interface(s) (not shown) may provide an interface for the system 100 to communicate over one or more wired or wireless network(s) and/or with any other suitable device. In some examples, the system 100 may be included in or associated with, but is not limited to, a server, a workstation, a desktop computing device, or a mobile computing device. For example, the mobile computing device may be a laptop computing device, a handheld computing device, a handset, a tablet, a smartphone, a netbook, Ultrabook, etc.

In some examples, the system 100 may be integrated into a computer system. For example, the computer system may be a laptop, a personal computer (PC), etc. However, in some examples, the system 100 can be alternatively configured as a standalone device that may be coupled to such a computer system using conventional technologies, including both wired and wireless connections.

In some examples, the system 100 may have more or less components, and/or different architectures. For example, the system 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like.

In some examples, the system 100 may be used for a variety of purposes, including, but not limited to, being part of a target recognition, analysis, and tracking system to recognize human and non-human targets in a capture area of the physical space without the use of special sensing devices attached to the subjects, uniquely identifying subjects, and tracking subjects in three-dimensional space. The system 100 may also be configured to capture video with depth information, including a depth image that may include depth values, via any suitable technique. For example, video with depth information can be captured using triangulation, time-of-flight, structured light, stereo image, or the like.

In some examples, the system 100 may be configured to operate as a depth camera that may capture a depth image of a scene. For example, the depth image may include a two-dimensional (2D) pixel area of the captured scene where each pixel in the 2D pixel area may represent a depth value such as a distance in, for example, centimeters, millimeters, or the like of an object in the captured scene from the camera. In this example, the system 100 includes an IR light projector 108, an IR camera 104, and a visible light texture camera 106 that are configured in an array.

In some examples, various techniques may be utilized to capture depth video frames. For example, the system 100 may use structured light to capture depth information. In such an analysis, patterned light may be projected onto the capture area. For example, the patterned light may be light displayed as a known pattern such as a grid pattern or a stripe pattern. In some examples, the patterned light may be displayed via the IR light projector 104. Upon striking the surface of one or more objects in the capture area, the patterned light may become deformed in response. Such a deformation of the pattern may be captured by, for example, the IR camera 104 or the texture camera 106. The captured deformation may then be analyzed to determine a physical distance from the system 100 to a particular location on the objects.

In some examples, the system 100 may utilize two or more physically separated cameras 104, 106 that may view a capture area from different angles, to obtain visual stereo data that may be resolved to generate depth information. In some examples, other types of depth image arrangements using single or multiple cameras can also be used to create a depth image. In some examples, the system 100 may then provide the depth information and images captured by, for example, IR camera 104 and the texture camera 106, including a skeletal model and/or facial tracking model that may be generated by the system 100. For example, the skeletal or facial tracking models, depth information, and captured images may be used to create a virtual screen, adapt the user interface, or control an application.

Thus, the system 100 may include a projector 108, an IR camera 104, another texture camera 106, and a processor 112 (controller) configured to operate system 100 according to the embodiments described herein. However, the above assembly configuration is described for illustration purposes only, and is not intended to be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and a third camera may be used to capture images of the object in order to identify image distortions in the reconstructed object and to compensate for identified distortions. For example, the third camera may have a resolution that is different than those of the two cameras.

Techniques described herein are directed to the calibration of a texture camera 106 in system 100. For example, the system 100 may be a stereo depth camera system. For example, the calibration may calibrate the texture camera 106 to a depth image produced by the infrared camera 104.

In some examples, calibration can be performed to calibrate intrinsic parameters, extrinsic parameters, or both, of the texture camera 106. For example, the intrinsic parameters may include one or more of lens parameters of the texture camera 106. The extrinsic parameters may include the Euclidean transformation of relative positioning and orientation of the texture camera 106 relative to the IR camera 104. In some examples, the calibration can be performed using extracted features from received texture images and depth images from the texture camera 106 and the infrared camera 104, as discussed in greater detail below. For example, the extracted features may be detected depth discontinuities of arbitrary objects placed in front of the system 100. In some examples, the objects may be a hand, a book, a table corner, etc. Thus, using the techniques described herein, the system 100 may be able to self calibrate the calibration parameters of the texture camera 106.

In some examples, the calibration parameters may be then used by an image processing unit to generate textures corresponding to depth values. For example, the image processing unit may receive a sequence of images and reconstruct depth using triangulation in response to camera and projector location coordinates. In some examples, when the image data from the stereo depth camera is processed to produce depth information including depth values, a triangulation process may be issued. More specifically, as discussed above, a coded light camera including an IR projector 108 can project one-dimensional code patterns onto a scene, and an IR camera 104 may capture the patterns. In some examples, decoding of the captured patterns at every pixel location $X_C$ in the camera may produce a code encoding the location $X_P$ of the projected plane. In triangulation, the plane may be intersected with the ray emanating from the camera focal point through $X_C$, yielding a distance to the object $z(X_C)$.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, projectors, processors, memory, etc.).

Figure 2:
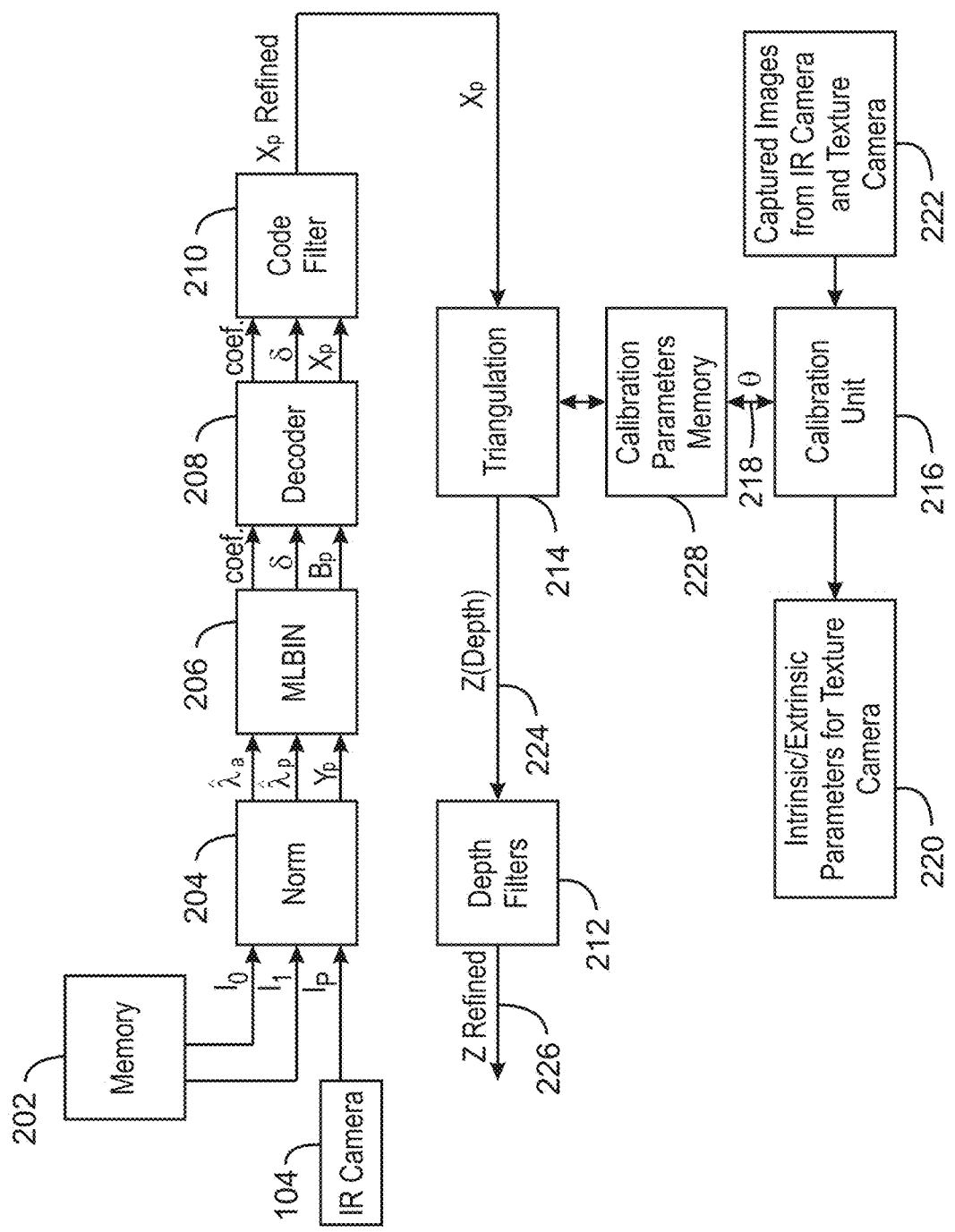
FIG. 2 is a block diagram illustrating an example image processing pipeline for a depth camera system.

FIG. 2 is a block diagram illustrating an example image processing pipeline for a depth camera system. The example image processing pipeline is referenced generally using the reference number 200. The depth camera system may include a projector configured to project a sequence of light patterns on an object and at least one camera configured to capture a sequence of images of the object illuminated with the projected light patterns. For example, the depth camera system may be the system 100 of FIG. 1 above.

As shown in FIG. 2, a flow of processing the input from an IR camera 104 to determine depth values is described. In the process, the depth values are determined using a triangulation reconstruction process. In some examples, the reconstruction process may include several operations of successive linearization of the distorted projector surface. The reconstruction process may also include a computation of an array-plane intersection from which the point in the world coordinates is triangulated. In some examples, the triangulation-based reconstruction process can be configured to take into account any form of projector distortion.

In some examples, the image processing pipeline 200 can receive a sequence of images and determine depth information in response to parameters of a projector and a camera. For example, the image processing pipeline 200 may be performed by processing logic that may comprise hardware (circuitry, dedicated logic, etc.), software (such as is run on a general purpose computer system or a dedicated machine), firmware, or any combination thereof. In some examples, the image processing pipeline 200 of Figure may be part of an image capture device. For example, the image processing pipeline 200 may be integrated into the image capture device 102 of FIG. 1 above. In another example, the image processing pipeline 200 may not be a part of any image capture device and may perform triangulation in a separate device.

The image processing pipeline 200 includes a memory 202 that stores sequences of patterns, including patterns $I_0$ and $I_1$. In some examples, an IR camera 104 may capture images and provide captured sequences of patterns $I_P$ to normalization unit 204. The sequences of patterns $I_P$ may then be normalized via normalization unit 204. The normalization unit 402 may then provide the normalized pattern sequences $\lambda_a$, $\lambda_p$, and $Y_p$ to binarizer 206. The binarizer 206 can generate binarization codes based on the normalized sequences of patterns and provide the binarization codes, including coefficients, $\delta$, and $B_P$, to decoder 208. The decoder 208 can decode each of the binarization codes to create a decoded value $X_P$ of a pixel location of the pixel on a projector plane. In some examples, the code filter 210 can perform filtering to remove or correct values that are not possible. The output of code filter 210 may be a value of $X_P$ corresponding to a pixel. For example, the value of $X_P$ may be received as an input at a triangulation-based reconstructions module.

In some examples, the image processing pipeline 200 also includes a triangulation processing unit 214. Triangulation processing unit 214 receives the refined $X_P$ value from the code filter 210 and triangulation process and calibration parameters from the calibration parameters memory 228 and, in response thereto, generates depth values, z 224, by use of triangulation. In some examples, the depth values may undergo filtering with depth filters 212 to generate refined depth values 226.

In some examples, calibration parameters for a texture camera may be modified or updated by calibration unit 216 and the calibration parameters may be provided to triangulation processing unit 214. In some examples, the calibration unit 216 can generate the calibration parameters based on captured images 222 that were captured by cameras, such as IR camera 104 and texture camera 106.

In some examples, the system devices, such as a cameras 104, 106, capture one or more images including one or more objects at the same time. In some examples, the objects may have one or more detectable features. For example, the features may be depth discontinuities. In addition, the objects may also have unknown geometries. For example, the objects may include a hand, or any other object including depth discontinuities. In some examples, a plurality of captures may be performed simultaneously by the different cameras in the system. In some examples, the geometries of the objects may have a sufficient amount of depth discontinuity to make the image sensitive to small perturbations of the calibration parameters. For example, the geometries may include lots of depth discontinuities, as measured by horizontal and vertical derivatives. However, in some examples, an image may not have a sufficient amount or quality of detectable features. In this example, additional captures may be made until an image with a sufficient number or quality of features is detected, as described in greater detail with respect to FIG. 3 below.

These captured images of the single target may be provided to calibration unit 216 that can performs calibration process using the captured images to generate calibration parameters to calibrate one or more devices in an active coded light triangulation system using the captured images of the target. In some examples, features extracted from a plurality of depth images may be aggregated to produce an aggregated set of extracted features. Likewise, features may be extracted from a plurality of color images and aggregated to produce a second set of extracted features. The aggregated sets of extracted features may then be compared to perform calibration.

In some examples, one or more calibration parameters of a texture camera may be set based on an alignment of extracted features from one captured image to the extracted features of another captured image. For example, the intrinsic and extrinsic calibration parameters of the texture camera may be updated based on alignment between features in the captured images. In some examples, the calibration parameters may include intrinsic parameters that relate to one or more of lens parameters of the texture camera. In some examples, the calibration parameters may include extrinsic parameters that relate to one or more of relative position, rotation and translation of the texture camera with respect to the infrared camera. In some examples, the alignment between two or more extracted features may first be checked to determine whether to update the calibration parameters, as also discussed in greater detail with respect to FIG. 3 below.

The diagram of FIG. 2 is not intended to indicate that the example image processing pipeline 200 is to include all of the components shown in FIG. 2. Rather, the example image processing pipeline 200 can be implemented using fewer or additional components not illustrated in FIG. 2 (e.g., additional parameters, filters, calibration units, memory, etc.).

Figure 3:
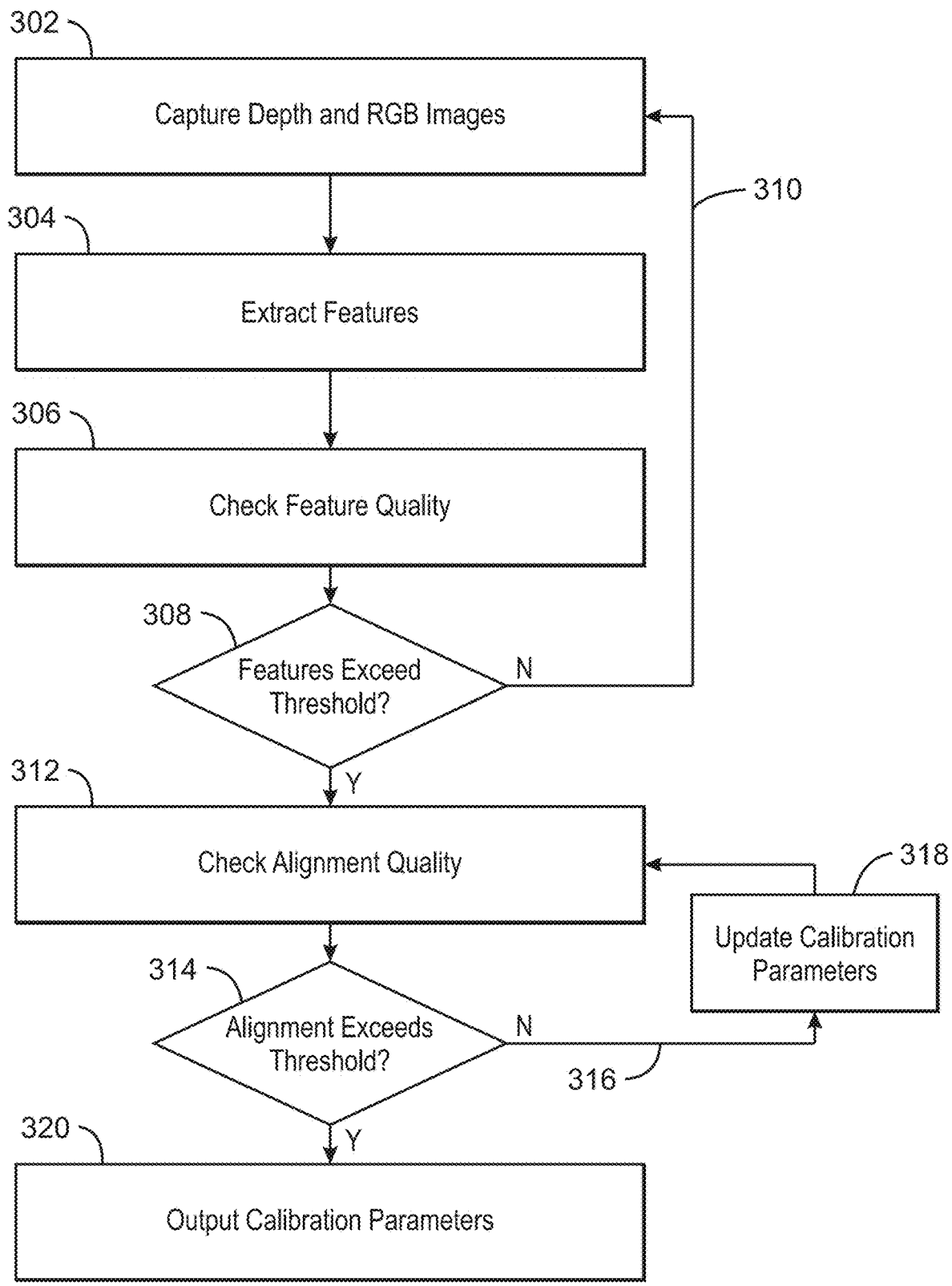
FIG. 3 is a flow chart illustrating an example process for calibrating texture cameras in depth camera systems.

FIG. 3 is a flow chart illustrating an example process for calibrating texture cameras in depth camera systems. The example process is generally referred to by the reference number 300 and can be implemented in the depth camera system 100 above or the computing device 800 below.

At block 302, a plurality of depth and color images is captured. For example, at least one depth image and one color image may be captured.

At block 304, features are extracted from the captured images. For example, the features may be pixels with detected depth discontinuities. In some examples, at least one feature may be extracted from each captured depth image and each captured color image. In some examples, the features may be extracted for quality detection and comparison. For example, the extracted features may take the form of extracted feature images, such as those seen in examples 400B and 500B in FIGS. 4 and 5 below. In some examples, specific usage of the three RGB color channels may enhance the calibration feature extraction stage. For example, features may be extracted from each channel of the three RGB color channels and combined to form an extracted feature image for the color image.

At block 306, a quality of the detected features is checked. In some examples, the quality of the features may be measured in amount of smoothness of depth edges in the case of the features being depth discontinuities. For example, the smoothness of the depth edges may be summed for each image. In some examples, a number of detected features may also be checked. For example, a number of pixels with detected depth discontinuities may be calculated.

At decision diamond 308, the quality is compared against a predetermined threshold quality value. In some examples, if the quality of the features does not exceed a predetermined threshold value then the process may continue at block 302 as indicated by an arrow 310. For example, if the detected features are not good enough, another set of frames is captured and the process is repeated at block 302. In some examples, if the quality of the features exceeds the predetermined threshold value, then the process may continue at block 312. In some examples, a detected number of features may also be compared against a threshold number. In some examples, if the number of the features does not exceed a predetermined threshold value then the process may continue at block 302 as indicated by an arrow 310. If the number of the features exceeds the predetermined threshold value, then the process may continue at block 312.

At block 312, an alignment quality is checked. For example, an extracted features image from a depth image may be compared to an extracted feature image from a color image, and the features therein may be compared for alignment. In some examples, a misalignment score may be generated based on the comparison. For example, the misalignment score may be calculated using Eq. 1 below.

At decision diamond 314, the alignment between the extracted features may be compared with a predetermined alignment threshold. For example, if the misalignment score exceeds a predetermined threshold value, then the process may continue at block 318 as indicated by arrow 316. In some examples, if the misalignment score does not exceed the predetermined threshold value, then the process may end at block 320.

At block 318, the calibration parameters may be updated. For example, the calibration parameters may be modified based on an alignment between features of two captured images. In some examples, the calibration parameters may be modified such that the alignment between the features of the two captured images is below a threshold difference. For example, the calibration parameters may be adjust until the misalignment score is detected as below a threshold misalignment score. For example, two images, a depth image and an infrared image, Z and texture image I, may be received. In some examples, both images Z and I can be represented mathematically as real functions on the unit square. For example, the texture mapping TM of the texture image mapped to the depth image may be calculated using the equation:

$$TM(\theta)=I \cdot \varphi(\theta) \qquad \text{Eq. 1}$$

where $\theta$ may denote the set of calibration parameters of the texture camera, and $\varphi(\theta)$ may denote the texture mapping function mapping from the domain of the texture image to the domain of the depth image. For example, the texture mapping function may be a "warping" on the unit square. In some examples, the calibration parameters may include one or more intrinsic or extrinsic parameters of the texture camera.

In some examples, an optimization problem may then be solved with respect to the calibration parameters in order to improve the alignment. For example, the optimization problem may be expressed using the equation:

$$\min_\theta \|F(TM(\theta))-F(Z)\| \qquad \text{Eq. 2}$$

where function F denotes some feature extraction method. For example, the feature extraction method may be the absolute value of the image gradient. When the system is well calibrated, the images TM and Z are aligned, in the sense that prominent features in Z and TM such as edges appear at the same locations. For example, $\theta=\theta_0$ for some nominal calibration parameters in well-calibrated systems.

By contrast, when the system is out of calibration, then $\theta \neq \theta_0$. In some examples, in order to recover the original calibration parameters, then the optimization problem of Eq. 2 can be solved with respect to the calibration parameters $\theta$ to achieve the best alignment. In some examples, the feature extraction operator F can be different for the two images, and thus the distance between the two images. In some examples, both the features and the distance can be learned. For example, a neural network may be trained to detect the features and the distance between images, or amount of misalignment.

At block 320, the calibration parameters are output. For example, the texture camera may receive and use the updated calibration parameters. Thus, if the texture camera may have lost calibration for any reason, the updated calibration parameters may enable the texture camera to operate without producing artifacts or other distortions due to being decalibrated.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4B:
FIGS. 4A and 4B are an example infrared input image and a corresponding example extracted feature image, respectively.
Figure 4A:

FIGS. 4A and 4B are an example infrared input image and a corresponding example extracted feature image, respectively. The example infrared image and extracted feature image are generally referred to by the reference numbers 400A and 400B, respectively, and can be processed in the computing device 800 below. For example, the extracted feature image 400B can be generated by the feature extractor 834 of the computing device of FIG. 8, or the feature extractor module 908 of the computer readable media 900 of FIG. 9 below.

Figures 5A, 5B:
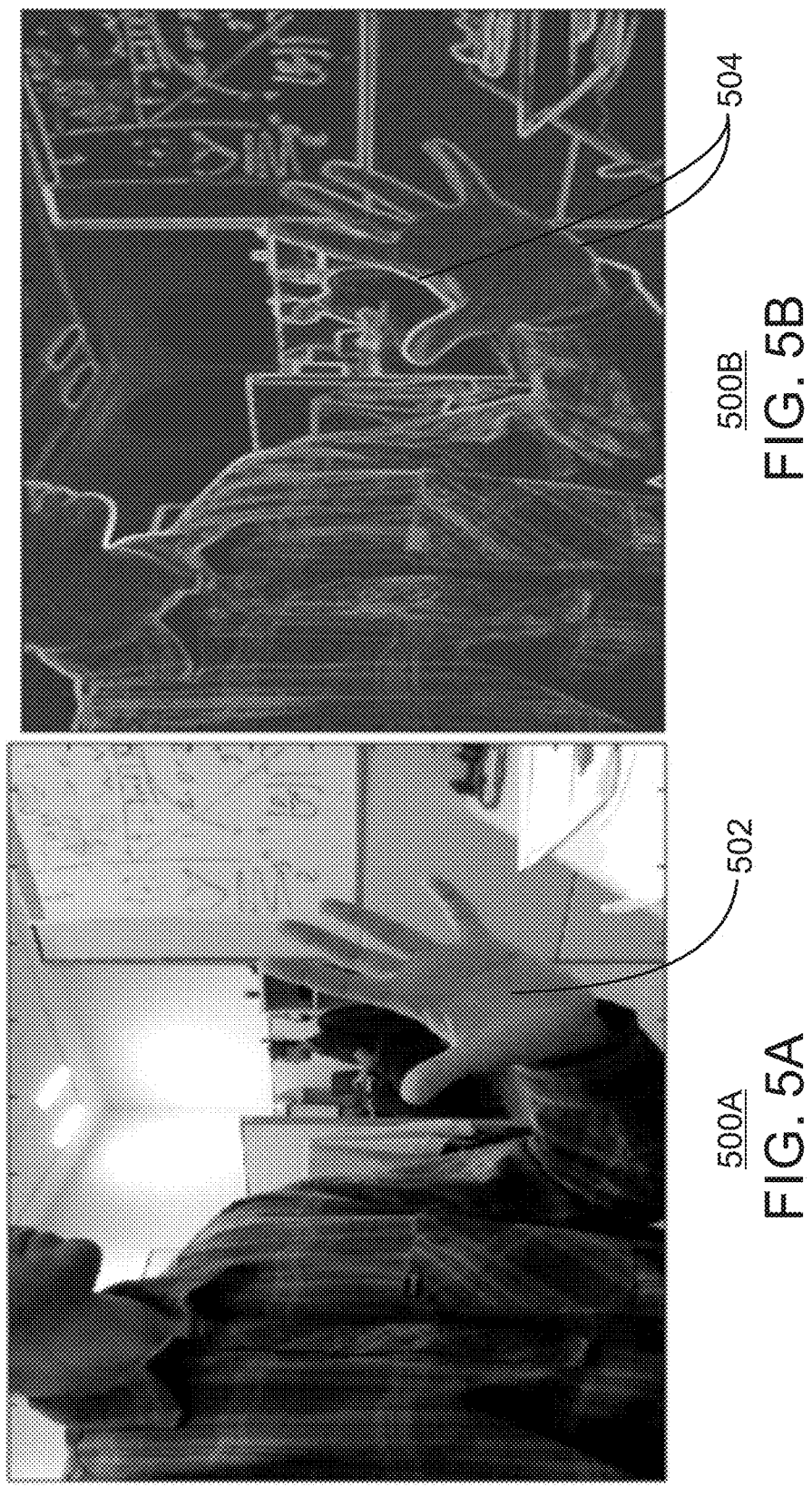
FIGS. 5A and 5B are an example input texture image and a corresponding example extracted feature image, respectively.

FIG. 4A shows an infrared image of a hand 402 as illuminated by infrared light. For example, the hand may have been illuminated using an infrared light projector. FIG. 4B shows an output extracted features image 400B that corresponds to 400A. The extracted features image 400B shows features 404 corresponding to the hand 402. Thicker lines in 400B indicate features with higher values. For example, the values may correspond to a normal calculated based on a horizontal derivative and a vertical derivative for each pixel. Features 404 with higher values indicated by heavy lines may be depth discontinuities detected around the perimeter of hand 402. In some examples, these extracted features 404 may be compared with extracted features from a color image as shown in FIG. 5B below. For example, the extracted features 404 may be compared for alignment as described in FIG. 3 above. In some examples, the features of feature image 400B may be further filtered using any suitable threshold. For example, features with values exceeding the threshold may be used for the alignment comparison.

The images of FIGS. 4A and 4B are not intended to indicate that the example infrared image 400A or the extracted feature image 400B is to include all of the components shown in FIGS. 4A and 4B. Rather, the example infrared image 400A or the extracted feature image 400B may include fewer or additional components not illustrated in FIGS. 4A and 4B (e.g., additional features, objects, etc.).

FIGS. 5A and 5B are an example input texture image and a corresponding example extracted feature image, respectively. The example texture image and extracted feature image are generally referred to by the reference numbers 500A and 500B, respectively, and can be processed in the computing device 800 below. For example, the extracted feature image 500B can be generated by the feature extractor 834 of the computing device of FIG. 8, or the feature extractor module 908 of the computer readable media 900 of FIG. 9 below.

FIG. 5A shows a texture image of a hand 502. For example, the texture image may have been captured by a texture camera such as a webcam or other digital camera. FIG. 5B shows extracted features 504 corresponding to the hand 504. In some examples, the extracted features 504 may correspond to depth discontinuities. Thicker lines may represent features with higher values. For example, the values may correspond to a normal calculated based on a horizontal derivative and a vertical derivative for each pixel. In some examples, the extracted features 504 may be compared with the extracted features of FIG. 4B above according and compared for alignment as described in FIG. 3 above. The features of 500B may be filtered based on a threshold or otherwise, as discussed in FIG. 4B above.

The images of FIGS. 5A and 5B are not intended to indicate that the example infrared image 500A or the extracted feature image 500B is to include all of the components shown in FIGS. 5A and 5B. Rather, the example infrared image 500A or the extracted feature image 500B may include fewer or additional components not illustrated in FIGS. 5A and 5B (e.g., additional features, objects, etc.).

Figure 6C:
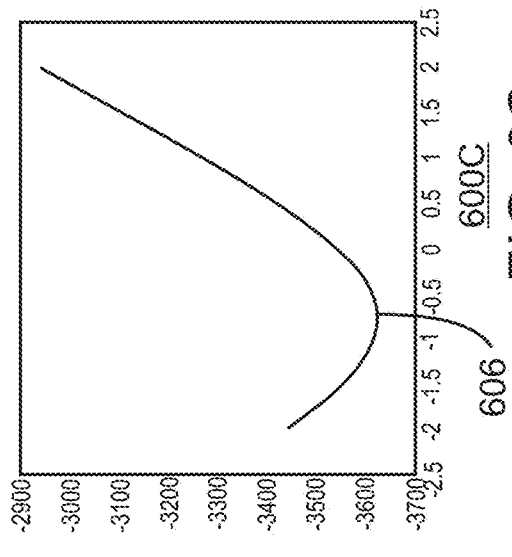
FIGS. 6A, 6B, 6C are an example set of optimization curves for rotation calibration parameter in an X rotation, Y rotation, and Z rotation, respectively.
Figure 6B:
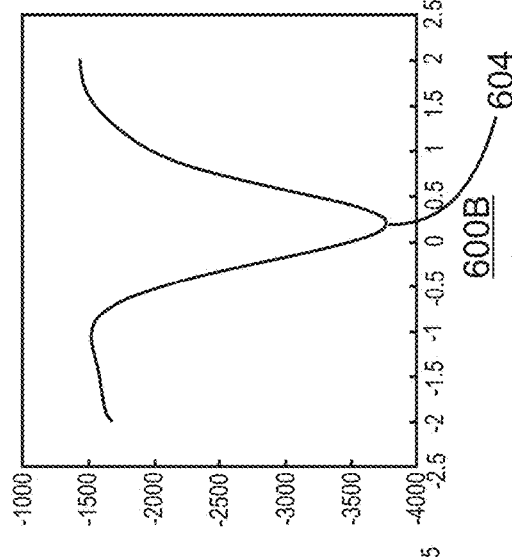
Figure 6A:
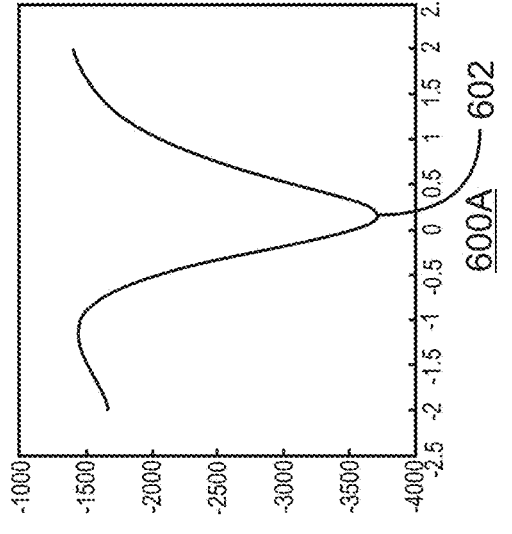

FIGS. 6A, 6B, 6C are an example set of optimization curves for rotation calibration parameters in an X rotation, Y rotation, and Z rotation, respectively. For example, the calibration parameter may be for the X rotation, Y rotation, and Z rotation in the plane of a projector and an infrared camera of a depth camera system. The sets of optimization curves are generally referenced using the reference numbers 600A, 600B, and 600C, and can be generated using the calibrator 840 of the computing device 800 below or the calibrator module 914 of the computer readable media 900 of FIG. 9 below. The horizontal axis of the graphs shown in FIGS. 6A, 6B, 6C may represent parameter values. The vertical axis of the graphs shown in FIGS. 6A, 6B, and 6C, may represent misalignment values, with higher values representing greater misalignment.

As shown in optimization curves 600A, 600B, and 600C, a local minimum 602, 604, 606 can be detected for each curve. In some examples, a value of "0" along the x axis may represent a calibration value from the manufacturer. Thus, as shown in FIG. 6A, the local minimum exists at a value that is slightly higher than the calibration value from the manufacture by about +0.2. Likewise, the local minimum 604 in FIG. 6B also has a calibration value of about +0.2. By contrast, the local minimum 606 in FIG. 6C has a calibration value of about The local minimums 602, 604, 606 may thus indicate calibration parameter values that result in reduced misalignment as compared to the original calibration value set by a manufacturer.

Figure 6D:
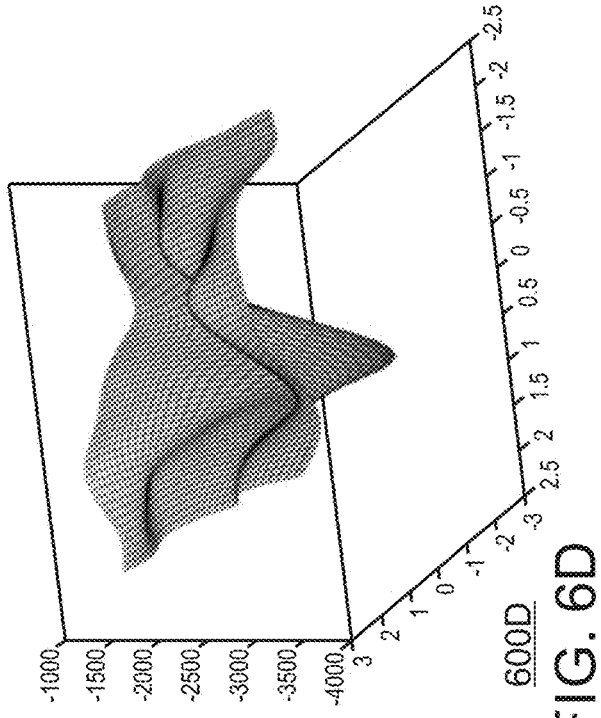
FIG. 6D is an example three dimensional optimization curve for a set of two calibration parameters.

FIG. 6D is an example three dimensional optimization curve for a set of two calibration parameters. The optimization curve is referenced generally using the reference number 600D and can be generated using the calibrator 840 of the computing device 800 below or the calibrator module 914 of the computer readable media 900 of FIG. 9 below. The vertical axis of 6D may represent misalignment, and the horizontal and depth axes may represent calibration values for two calibration parameters.

The optimization curve 600D is a three dimensional optimization curve. For example, the optimization curve of 600D may be a combination two of the optimization curves 600A, 600B, and 600C. Again, 0 in the depth and horizontal axes may represent a nominal value set for each parameter by a manufacturer. In some examples, a calibration value for each of the two represented parameters may be selected by locating a local minimum of the three dimensional optimization curve and determining the respective calibration values for each of the two parameters.

Figure 7:
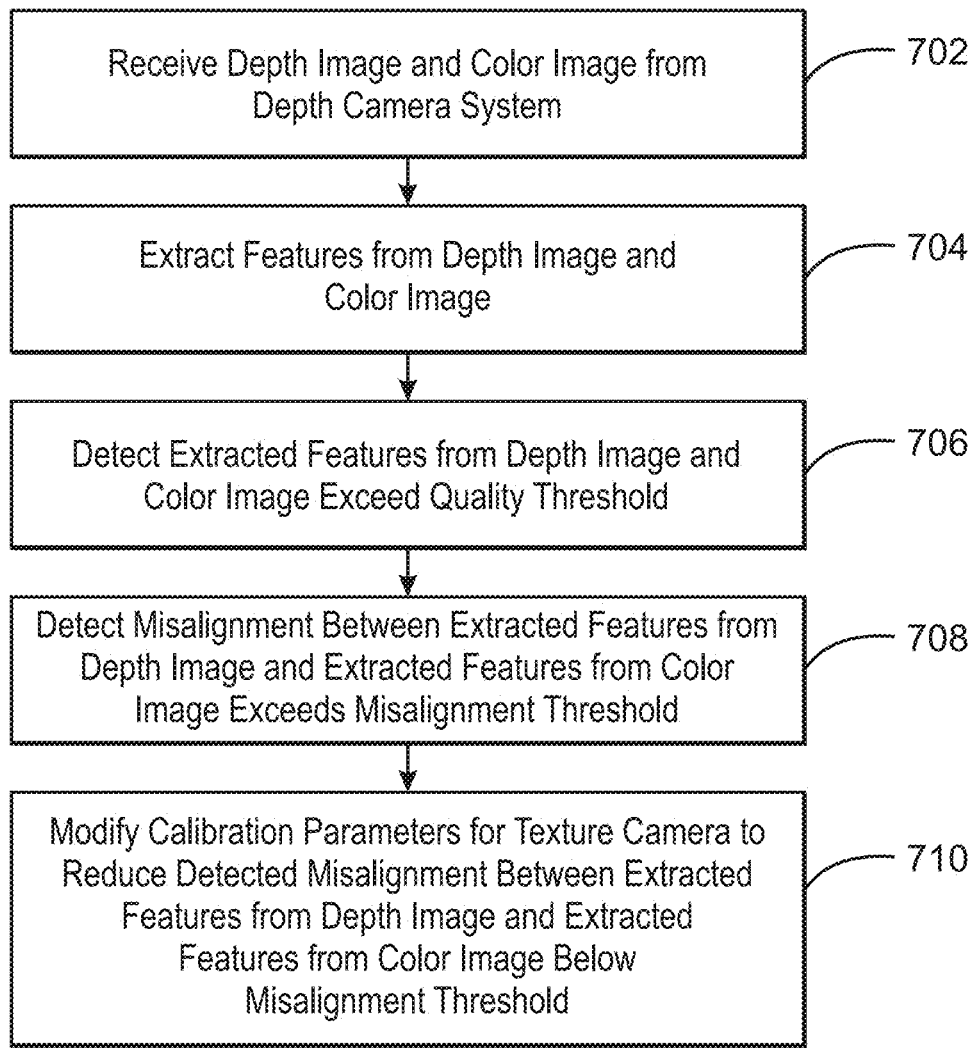
FIG. 7 is a flow chart illustrating a method for calibrating texture cameras.

FIG. 7 is a flow chart illustrating a method for calibrating texture cameras. The example method is generally referred to by the reference number 700 and can be implemented in the triangulation-based system 100 of FIG. 1 above, the processor 802 of the computing device 800 of FIG. 8 below, or the computer readable media 900 of FIG. 9 below.

At block 702, a processor receives a depth image and a color image from a depth camera system. For example, the depth image may have been captured by a depth camera and the color image may be been captured by a texture camera of the same depth camera system.

At block 704, the processor extracts features from the depth image and the color image. In some examples, the features may correspond to detected discontinuities in the depth image and the color image. For example, discontinuities may be detected in the depth image based on horizontal derivatives and vertical derivatives of depth. In color images, discontinuities may be detected based on horizontal derivatives and vertical derivatives of color. In some examples, a feature may be extracted in response to detecting a value of a normal derivative exceeding a predetermined threshold value. In some examples, a normal can be calculated based on the horizontal derivative and vertical derivative of each pixel. In such examples, normals having values exceeding a predetermined threshold value may be extracted as features. In some examples, the processor may train a convolutional neural network to extract the features. For example, the features may then be extracted using the trained convolutional neural network. In some examples, the processor may generate gradient images including the extracted features. In some examples, the processor may extract the features from each channel of three RGB color channels of the color image and combine the extracted features to form an extracted feature image for the color image.

At block 706, the processor detects the extracted features from the depth image and the color image exceed a quality threshold. For example, the quality threshold may be a threshold number of extracted features. The processor may thus detect that the depth image and the color image each comprises a number of features that exceeds a threshold number of features. In some examples, additional depth images or color images may be received and extracted features may be aggregated until the quality threshold is exceeded. For example, the processor may receive additional depth images and additional color images in response to detecting that a quality threshold is not exceeded. The processor may then generate aggregated features to be used by the misalignment detector at block 708 below.

At block 708, the processor detects misalignment between the extracted features from depth image and the extracted features from color image exceeds misalignment threshold. For example, the processor can detect misalignment based on an absolute value of a distance between extracted features. In some examples, the processor may compare two generated gradient images to determine an amount of misalignment. In some examples, the processor can detect misalignment by comparing detected discontinuities in the extracted features from depth image and the extracted features from color image.

At block 710, the processor modifies calibration parameters for a texture camera to reduce detected misalignment between the extracted features from depth image and the extracted features from color image below misalignment threshold. In some examples, the calibration parameters may include extrinsic parameters that relate to a relative position, a rotation, or a translation of the texture camera with respect to the infrared camera.

This process flow diagram is not intended to indicate that the blocks of the example process 700 are to be executed in any particular order, or that all of the blocks are to be included in every case. Further, any number of additional blocks not shown may be included within the example process 700, depending on the details of the specific implementation.

Figure 8:
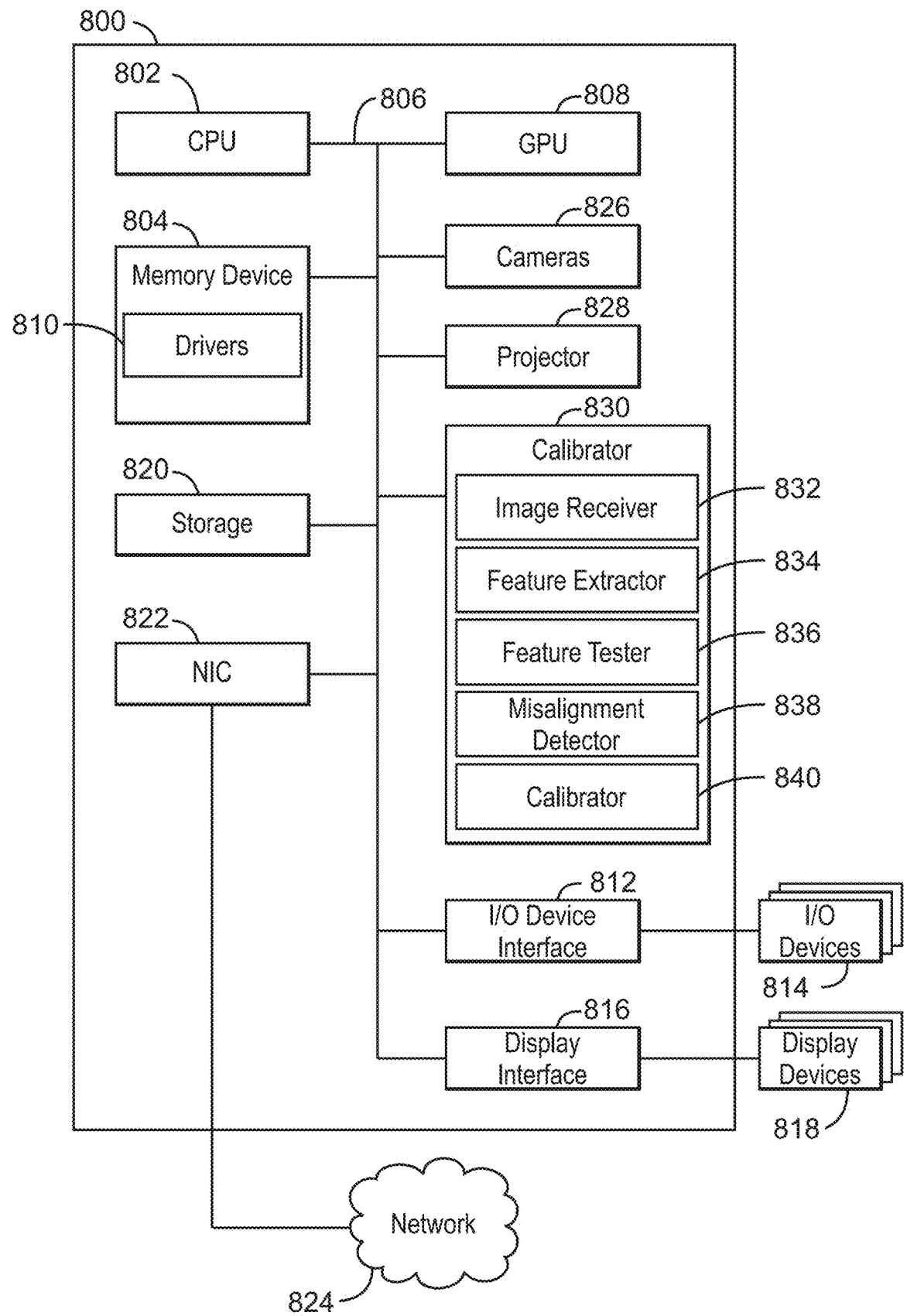
FIG. 8 is block diagram illustrating an example computing device that can calibrate a texture camera.

Referring now to FIG. 8, a block diagram is shown illustrating an example computing device that can calibrate a texture camera. The computing device 800 may be, for example, a laptop computer, desktop computer, tablet computer, mobile device, or wearable device, among others. In some examples, the computing device 800 may be a smart camera or a digital security surveillance camera. The computing device 800 may include a central processing unit (CPU) 802 that is configured to execute stored instructions, as well as a memory device 804 that stores instructions that are executable by the CPU 802. The CPU 802 may be coupled to the memory device 804 by a bus 806. Additionally, the CPU 802 can be a single core processor, a multi-core processor, a computing cluster, or any number of other configurations. Furthermore, the computing device 800 may include more than one CPU 802. In some examples, the CPU 802 may be a system-on-chip (SoC) with a multi-core processor architecture. In some examples, the CPU 802 can be a specialized digital signal processor (DSP) used for image processing. The memory device 804 can include random access memory (RAM), read only memory (ROM), flash memory, or any other suitable memory systems. For example, the memory device 804 may include dynamic random access memory (DRAM).

The memory device 804 can include random access memory (RAM), read only memory (ROM), flash memory, or any other suitable memory systems. For example, the memory device 804 may include dynamic random access memory (DRAM). The memory device 804 may include device drivers 810 that are configured to execute the instructions for device discovery. The device drivers 810 may be software, an application program, application code, or the like.

The computing device 800 may also include a graphics processing unit (GPU) 808. As shown, the CPU 802 may be coupled through the bus 806 to the GPU 808. The GPU 808 may be configured to perform any number of graphics operations within the computing device 800. For example, the GPU 808 may be configured to render or manipulate graphics images, graphics frames, videos, or the like, to be displayed to a user of the computing device 800.

The memory device 804 can include random access memory (RAM), read only memory (ROM), flash memory, or any other suitable memory systems. For example, the memory device 804 may include dynamic random access memory (DRAM). The memory device 804 may include device drivers 810 that are configured to execute the instructions for generating virtual input devices. The device drivers 810 may be software, an application program, application code, or the like.

The CPU 802 may also be connected through the bus 806 to an input/output (I/O) device interface 812 configured to connect the computing device 800 to one or more I/O devices 814. The I/O devices 814 may include, for example, a keyboard and a pointing device, wherein the pointing device may include a touchpad or a touchscreen, among others. The I/O devices 814 may be built-in components of the computing device 800, or may be devices that are externally connected to the computing device 800. In some examples, the memory 804 may be communicatively coupled to I/O devices 814 through direct memory access (DMA).

The CPU 802 may also be linked through the bus 806 to a display interface 816 configured to connect the computing device 800 to a display device 818. The display device 818 may include a display screen that is a built-in component of the computing device 800. The display device 818 may also include a computer monitor, television, or projector, among others, that is internal to or externally connected to the computing device 800.

The computing device 800 also includes a storage device 820. The storage device 820 is a physical memory such as a hard drive, an optical drive, a thumbdrive, an array of drives, a solid-state drive, or any combinations thereof. The storage device 820 may also include remote storage drives.

The computing device 800 may also include a network interface controller (NIC) 822. The NIC 822 may be configured to connect the computing device 800 through the bus 806 to a network 824. The network 824 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 800 further includes a cameras 826. For example, the camera 826 may include a depth camera and a texture camera. In some example, the depth camera may be an infrared camera and may include a processor to generate depth images. In some examples, the texture camera may be used to capture color images. For example, the texture camera may be a high-definition RGB camera.

The computing device 800 further includes a projector 828. For example, the projector 828 may be an infrared projector. In some examples, the projector 828 can be used to project infrared light to enable an infrared camera 826 to capture infrared images by illuminating a target with infrared light.

The computing device also further includes a calibrator 830. For example, the calibrator 830 can be used to calibrate a texture camera 826 with a depth image from a depth camera 826. The calibrator 830 can include an image receiver 832, a feature extractor 834, a feature tester 836, a misalignment detector 838, and a calibrator 840. In some examples, each of the components 832-844 of the calibrator 830 may be a microcontroller, embedded processor, or software module. In some examples, the feature extractor 834 or the misalignment detector 838 may also be convolutional networks that are trained to perform the functions described below. The image receiver 832 can receive a depth image from a depth camera 826 and a color image from a texture camera 826. For example, the depth camera and the texture camera may be in the same depth camera system. In some examples, the depth camera system may be the computing device 800. In some examples, the image receiver 832 can receive additional depth images and additional color images in response to detecting that a quality threshold is not exceeded.

The feature extractor 834 can extract features from the depth image and the color image. For example, the feature extractor 834 can generate gradient images based on horizontal derivatives and vertical derivatives of the depth image and the color image. In some examples, the feature extractor 834 can extract features based on pixels that exceed a threshold normal derivative value. In some examples, the feature extractor 834 may be a neural network. For example, the feature extractor 834 may be a convolutional neural network trained to extract features from color images and depth images. In some examples, the extracted features may be detected discontinuities. In some examples, the feature extractor 834 can extract the features from each channel of three RGB color channels of the color image and combine the extracted features to form an extracted feature image for the color image.

The feature tester 836 can detect that the extracted features from the depth image and the color image exceed a quality threshold. For example, the feature tester 836 may detect that an amount of the extracted features exceeds a predetermined feature threshold.

The misalignment detector 838 can detect a misalignment between the extracted features from depth image and the extracted features from color image exceeds misalignment threshold. For example, the misalignment may be an absolute value of the distance between the extracted features. In some examples, the misalignment detector 838 detect the misalignment by comparing detected discontinuities.

The calibrator 840 can modify calibration parameters for the texture camera to reduce the detected misalignment between the extracted features from the depth image and the extracted features from the color image below a misalignment threshold. For example, the calibration parameters may include an intrinsic parameter and an extrinsic parameter of the texture camera. In some examples, the calibration parameters may include a rotation parameter and a principal point of the texture camera.

The block diagram of FIG. 8 is not intended to indicate that the computing device 800 is to include all of the components shown in FIG. 8. Rather, the computing device 800 can include fewer or additional components not illustrated in FIG. 8, such as additional buffers, additional processors, and the like. The computing device 800 may include any number of additional components not shown in FIG. 8, depending on the details of the specific implementation. Furthermore, any of the functionalities of the CPU 802 may be partially, or entirely, implemented in hardware and/or in a processor. For example, the functionality of the calibrator 830 may be implemented with an application specific integrated circuit, in logic implemented in a processor, in logic implemented in a specialized graphics processing unit such as the GPU 808, or in any other device.

Figure 9:
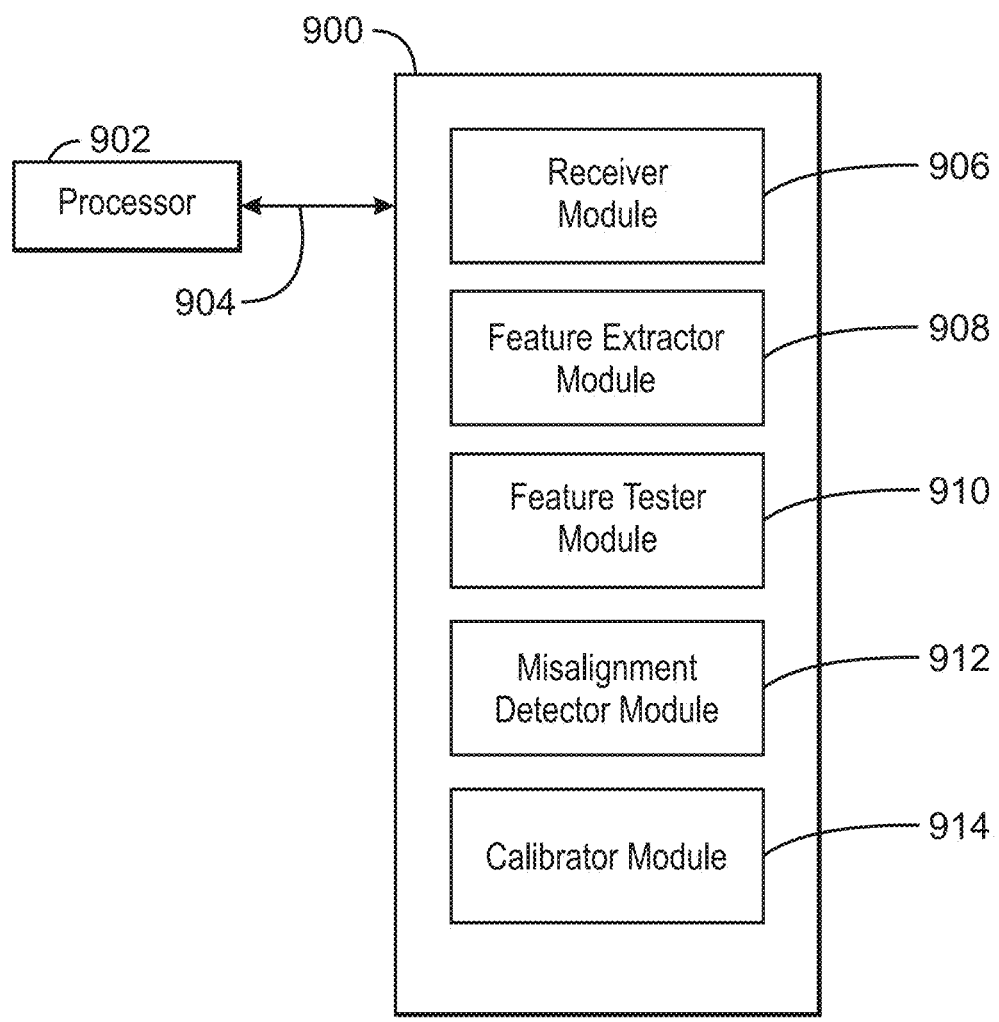
FIG. 9 is a block diagram showing computer readable media that store code for calibrating texture cameras in depth camera systems.

FIG. 9 is a block diagram showing computer readable media 900 that store code for calibrating texture cameras in depth camera systems. The computer readable media 900 may be accessed by a processor 902 over a computer bus 904. Furthermore, the computer readable medium 900 may include code configured to direct the processor 902 to perform the methods described herein. In some embodiments, the computer readable media 900 may be non-transitory computer readable media. In some examples, the computer readable media 900 may be storage media.

The various software components discussed herein may be stored on one or more computer readable media 900, as indicated in FIG. 9. For example, a receiver module 906 may be configured to receive a depth image from an infrared camera and a color image from a texture camera of a depth camera system. In some examples, the receiver module 906 may be configured to receive additional depth images and additional color images in response to detecting that a quality threshold is not exceeded. A feature extractor module 908 may be configured to extract features from the depth image and the color image. In some examples, the feature extractor module 908 may be configured to generate gradient images based on horizontal derivatives and vertical derivatives of the depth image and the color image. In some examples, the feature extractor module 908 may be configured to extract the features from each channel of three RGB color channels of the color image and combine the extracted features to form an extracted feature image for the color image. In some examples, the feature extractor module 908 may be configured to train a convolutional neural network to extract the features. A feature tester module 910 may be configured to detect that the extracted features from the depth image and the color image exceed a quality threshold. For example, the feature tester module 910 may be configured to detect that the depth image and the color image each comprises a number of features that exceeds a threshold number of features. In some examples, the receiver module 906 may be configured to receive an additional depth image and an additional color image. The feature extractor module 908 may also be configured to aggregate extracted features from the additional depth image and the additional color image with the extracted features from the depth image and the color image. A misalignment detector module 912 may be configured to detect a misalignment between the extracted features from depth image and the extracted features from color image exceeds misalignment threshold. For example, the misalignment detector module 912 may be configured to compare gradient images to determine an amount of misalignment. A calibrator module 914 may be configured to modify calibration parameters for the texture camera to reduce the detected misalignment between the extracted features from the depth image and the extracted features from the color image below a misalignment threshold. In some examples, the calibration parameters may include extrinsic parameters that relate to a relative position, a rotation, or a translation of the texture camera with respect to the infrared camera.

The block diagram of FIG. 9 is not intended to indicate that the computer readable media 900 is to include all of the components shown in FIG. 9. Further, the computer readable media 900 may include any number of additional components not shown in FIG. 9, depending on the details of the specific implementation.

EXAMPLES

Example 1 is an apparatus for calibrating texture cameras. The apparatus includes an image receiver to receive a depth image from a depth camera and a color image from a texture camera. The apparatus also includes a feature extractor to extract features from the depth image and the color image. The apparatus further includes a feature tester to detect that the extracted features from the depth image and the color image exceed a quality threshold. The apparatus includes a misalignment detector to detect a misalignment between the extracted features from depth image and the extracted features from color image exceeds a misalignment threshold. The apparatus further also includes a calibrator to modify calibration parameters for the texture camera to reduce the detected misalignment between the extracted features from the depth image and the extracted features from the color image below a misalignment threshold.

Example 2 includes the apparatus of example 1, including or excluding optional features. In this example, the feature extractor is to generate gradient images based on horizontal derivatives and vertical derivatives of the depth image and the color image.

Example 3 includes the apparatus of any one of examples 1 to 2, including or excluding optional features. In this example, the feature extractor is to extract features based on pixels that exceed a threshold normal derivative value.

Example 4 includes the apparatus of any one of examples 1 to 3, including or excluding optional features. In this example, the misalignment comprises an absolute value of the distance between the extracted features.

Example 5 includes the apparatus of any one of examples 1 to 4, including or excluding optional features. In this example, the calibration parameters comprise an intrinsic parameter and an extrinsic parameter of the texture camera.

Example 6 includes the apparatus of any one of examples 1 to 5, including or excluding optional features. In this example, the calibration parameters comprise a rotation parameter and a principal point of the texture camera.

Example 7 includes the apparatus of any one of examples 1 to 6, including or excluding optional features. In this example, the extracted features comprise detected discontinuities, the misalignment detector to detect the misalignment by comparing the detected discontinuities.

Example 8 includes the apparatus of any one of examples 1 to 7, including or excluding optional features. In this example, the features extractor comprises a trained neural network.

Example 9 includes the apparatus of any one of examples 1 to 8, including or excluding optional features. In this example, an amount of the extracted features exceeds a predetermined feature threshold.

Example 10 includes the apparatus of any one of examples 1 to 9, including or excluding optional features. In this example, the depth camera comprises an infrared camera.

Example 11 is a method for calibrating texture cameras. The method includes receiving, via a processor, a depth image and a color image from a depth camera system. The method also includes extracting, via the processor, features from the depth image and the color image. The method further includes detecting, via the processor, the extracted features from the depth image and the color image exceed a quality threshold. The method also further includes detecting, via the processor, a misalignment between the extracted features from depth image and the extracted features from color image exceeds a misalignment threshold. The method also includes modifying, via the processor, calibration parameters for a texture camera to reduce the detected misalignment between the extracted features from the depth image and the extracted features from the color image below a misalignment threshold.

Example 12 includes the method of example 11, including or excluding optional features. In this example, detecting the extracted features exceed the quality threshold comprises detecting that the depth image and the color image each comprises a number of features that exceeds a threshold number of features.

Example 13 includes the method of any one of examples 11 to 12, including or excluding optional features. In this example, the method includes receiving additional depth images and additional color images, and aggregating extracted features from the additional depth images and the additional color images to generated aggregated features to be used by the misalignment detector to detect the misalignment.

Example 14 includes the method of any one of examples 11 to 13, including or excluding optional features. In this example, extracting the features from the depth image and the color image comprises detecting discontinuities in the depth image and the color image and extracting discontinuities comprising a normal derivative exceeding a predetermined threshold value.

Example 15 includes the method of any one of examples 11 to 14, including or excluding optional features. In this example, the method includes training a convolutional neural network to extract the features.

Example 16 includes the method of any one of examples 11 to 15, including or excluding optional features. In this example, detecting the misalignment between the extracted features from depth image and the extracted features from color image comprises comparing detected discontinuities in the extracted features from depth image and the extracted features from color image.

Example 17 includes the method of any one of examples 11 to 16, including or excluding optional features. In this example, the method includes receiving additional depth images and additional color images in response to detecting that a quality threshold is not exceeded.

Example 18 includes the method of any one of examples 11 to 17, including or excluding optional features. In this example, the calibration parameters comprise extrinsic parameters that relate to a relative position, a rotation, or a translation of the texture camera with respect to the infrared camera, or any combination thereof.

Example 19 includes the method of any one of examples 11 to 18, including or excluding optional features. In this example, the method includes extracting the features from each channel of three RGB color channels of the color image and combining the extracted features to form an extracted feature image for the color image.

Example 20 includes the method of any one of examples 11 to 19, including or excluding optional features. In this example, the method includes training a convolutional neural network to extract the features.

Example 21 is at least one computer readable medium for calibrating texture cameras in depth camera systems having instructions stored therein that direct the processor to receive a depth image from an infrared camera and a color image from a texture camera of a depth camera system. The computer-readable medium also includes instructions that direct the processor to extract features from the depth image and the color image. The computer-readable medium also includes instructions that direct the processor to detect that the extracted features from the depth image and the color image exceed a quality threshold. The computer-readable medium further includes instructions that direct the processor to detect a misalignment between the extracted features from depth image and the extracted features from color image exceeds misalignment threshold. The computer-readable medium also includes instructions that direct the processor to modify calibration parameters for the texture camera to reduce the detected misalignment between the extracted features from the depth image and the extracted features from the color image below a misalignment threshold.

Example 22 includes the computer-readable medium of example 21, including or excluding optional features. In this example, the computer-readable medium includes instructions to generate gradient images based on horizontal derivatives and vertical derivatives of the depth image and the color image.

Example 23 includes the computer-readable medium of any one of examples 21 to 22, including or excluding optional features. In this example, the computer-readable medium includes instructions to detect that the depth image and the color image each comprises a number of features that exceeds a threshold number of features.

Example 24 includes the computer-readable medium of any one of examples 21 to 23, including or excluding optional features. In this example, the computer-readable medium includes instructions to receive an additional depth image and an additional color image, and aggregate extracted features from the additional depth image and the additional color image with the extracted features from the depth image and the color image.

Example 25 includes the computer-readable medium of any one of examples 21 to 24, including or excluding optional features. In this example, the computer-readable medium includes instructions to compare gradient images to determine an amount of misalignment.

Example 26 includes the computer-readable medium of any one of examples 21 to 25, including or excluding optional features. In this example, the computer-readable medium includes instructions to detect the misalignment between the extracted features from depth image and the extracted features from color image by comparing detected discontinuities.

Example 27 includes the computer-readable medium of any one of examples 21 to 26, including or excluding optional features. In this example, the computer-readable medium includes instructions to receive additional depth images and additional color images in response to detecting that a quality threshold is not exceeded.

Example 28 includes the computer-readable medium of any one of examples 21 to 27, including or excluding optional features. In this example, the calibration parameters comprise extrinsic parameters that relate to a relative position, a rotation, or a translation of the texture camera with respect to the infrared camera, or any combination thereof.

Example 29 includes the computer-readable medium of any one of examples 21 to 28, including or excluding optional features. In this example, the computer-readable medium includes instructions to extract the features from each channel of three RGB color channels of the color image and combine the extracted features to form an extracted feature image for the color image.

Example 30 includes the computer-readable medium of any one of examples 21 to 29, including or excluding optional features. In this example, the computer-readable medium includes instructions to train a convolutional neural network to extract the features.

Example 31 is a system for calibrating texture cameras. The system includes an image receiver to receive a depth image from a depth camera and a color image from a texture camera. The system also includes a feature extractor to extract features from the depth image and the color image. The system further includes a feature tester to detect that the extracted features from the depth image and the color image exceed a quality threshold. The system also further includes a misalignment detector to detect a misalignment between the extracted features from depth image and the extracted features from color image exceeds a misalignment threshold. The system also includes a calibrator to modify calibration parameters for the texture camera to reduce the detected misalignment between the extracted features from the depth image and the extracted features from the color image below a misalignment threshold.

Example 32 includes the system of example 31, including or excluding optional features. In this example, the feature extractor is to generate gradient images based on horizontal derivatives and vertical derivatives of the depth image and the color image.

Example 33 includes the system of any one of examples 31 to 32, including or excluding optional features. In this example, the feature extractor is to extract features based on pixels that exceed a threshold normal derivative value.

Example 34 includes the system of any one of examples 31 to 33, including or excluding optional features. In this example, the misalignment comprises an absolute value of the distance between the extracted features.

Example 35 includes the system of any one of examples 31 to 34, including or excluding optional features. In this example, the calibration parameters comprise an intrinsic parameter and an extrinsic parameter of the texture camera.

Example 36 includes the system of any one of examples 31 to 35, including or excluding optional features. In this example, the calibration parameters comprise a rotation parameter and a principal point of the texture camera.

Example 37 includes the system of any one of examples 31 to 36, including or excluding optional features. In this example, the extracted features comprise detected discontinuities, the misalignment detector to detect the misalignment by comparing the detected discontinuities.

Example 38 includes the system of any one of examples 31 to 37, including or excluding optional features. In this example, the features extractor comprises a trained neural network.

Example 39 includes the system of any one of examples 31 to 38, including or excluding optional features. In this example, an amount of the extracted features exceeds a predetermined feature threshold.

Example 40 includes the system of any one of examples 31 to 39, including or excluding optional features. In this example, the depth camera comprises an infrared camera.

Example 41 is a system for calibrating texture cameras. The system includes means for receiving a depth image from a depth camera and a color image from a texture camera. The system also includes means for extracting features from the depth image and the color image. The system further includes means for detecting that the extracted features from the depth image and the color image exceed a quality threshold. The system also further includes means for detecting a misalignment between the extracted features from depth image and the extracted features from color image exceeds a misalignment threshold. The system also includes and means for modifying calibration parameters for the texture camera to reduce the detected misalignment between the extracted features from the depth image and the extracted features from the color image below a misalignment threshold.

Example 42 includes the system of example 41, including or excluding optional features. In this example, the means for extracting features is to generate gradient images based on horizontal derivatives and vertical derivatives of the depth image and the color image.

Example 43 includes the system of any one of examples 41 to 42, including or excluding optional features. In this example, the means for extracting features is to extract features based on pixels that exceed a threshold normal derivative value.

Example 44 includes the system of any one of examples 41 to 43, including or excluding optional features. In this example, the misalignment comprises an absolute value of the distance between the extracted features.

Example 45 includes the system of any one of examples 41 to 44, including or excluding optional features. In this example, the calibration parameters comprise an intrinsic parameter and an extrinsic parameter of the texture camera.

Example 46 includes the system of any one of examples 41 to 45, including or excluding optional features. In this example, the calibration parameters comprise a rotation parameter and a principal point of the texture camera.

Example 47 includes the system of any one of examples 41 to 46, including or excluding optional features. In this example, the extracted features comprise detected discontinuities, the misalignment detector to detect the misalignment by comparing the detected discontinuities.

Example 48 includes the system of any one of examples 41 to 47, including or excluding optional features. In this example, the means for extracting features comprises a trained neural network.

Example 49 includes the system of any one of examples 41 to 48, including or excluding optional features. In this example, an amount of the extracted features exceeds a predetermined feature threshold.

Example 50 includes the system of any one of examples 41 to 49, including or excluding optional features. In this example, the depth camera comprises an infrared camera.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for calibrating texture cameras, comprising a processor to:
   receive a plurality of depth images from a depth camera and a plurality of color images from a texture camera;
   extract features from the plurality of depth images and the plurality of color images;
   detect that the extracted features from the plurality of depth images and the plurality of color images exceed a quality threshold based on a smoothness of depth edges;
   aggregate the extracted features from the plurality of depth images to generate a first aggregated set of extracted features and aggregate the extracted features from the plurality of color images to generate a second aggregated set of extracted features;
   detect that a misalignment between the first aggregated set of extracted features from the plurality of depth images and the second aggregated set of extracted features from the plurality of color images exceeds a misalignment threshold; and
   modify calibration parameters for the texture camera to reduce the detected misalignment between the first aggregated set of extracted features from the plurality of depth images and the second aggregated set of extracted features from the plurality of color images below the misalignment threshold,
   wherein the calibration parameters are modified by solving an optimization problem comprising the calibration parameters and features extracted from a texture mapping of a color image among the plurality of color images mapped to a depth image among the plurality of depth images.

2. The apparatus of claim 1, wherein the processor is to generate gradient images based on horizontal derivatives and vertical derivatives of the plurality of depth images and the plurality of color images.

3. The apparatus of claim 1, wherein the processor is to extract the features based on pixels that exceed a threshold normal derivative value.

4. The apparatus of claim 1, wherein the misalignment comprises an absolute value of a distance between the extracted features.

5. The apparatus of claim 1, wherein the calibration parameters comprise an intrinsic parameter and an extrinsic parameter of the texture camera.

6. The apparatus of claim 1, wherein the calibration parameters comprise a rotation parameter and a principal point of the texture camera.

7. The apparatus of claim 1, wherein the extracted features comprise detected discontinuities, the processor to detect the misalignment by comparing the detected discontinuities.

8. The apparatus of claim 1, wherein the apparatus comprises a trained neural network.

9. The apparatus of claim 1, wherein an amount of the extracted features exceeds a predetermined feature threshold.

10. The apparatus of claim 1, wherein the depth camera comprises an infrared camera.

11. A method for calibrating texture cameras, comprising:
    receiving, via a processor, a plurality of depth images and a plurality of color images from a depth camera system;
    extracting, via the processor, features from the plurality of depth images and the plurality of color images;
    detecting, via the processor, that the extracted features from the plurality of depth images and the plurality of color images exceed a quality threshold based on a smoothness of depth edges;
    aggregating, via the processor, the extracted features from the plurality of depth images to generate a first aggregated set of extracted features and aggregating the extracted features from the plurality of color images to generate a second aggregated set of extracted features;
    detecting, via the processor, that a misalignment between the first aggregated set of extracted features from the plurality of depth images and the second aggregated set of extracted features from the plurality of color images exceeds a misalignment threshold; and
    modifying, via the processor, calibration parameters for a texture camera to reduce the detected misalignment between the first aggregated set of extracted features from the plurality of depth images and the second aggregated set of extracted features from the plurality of color images below the misalignment threshold,
    wherein the calibration parameters are modified by solving an optimization problem comprising the calibration parameters and features extracted from a texture mapping of a color image among the plurality of color images mapped to a depth image among the plurality of depth images.

12. The method of claim 11, wherein detecting the extracted features exceed the quality threshold comprises detecting that the plurality of depth images and the plurality of color images each comprises a number of features that exceeds a threshold number of features.

13. The method of claim 11, wherein extracting the features from the plurality of depth images and the plurality of color images comprises detecting discontinuities in each of the plurality of depth images and each of the plurality of color images and extracting discontinuities comprising a normal derivative exceeding a predetermined threshold value.

14. The method of claim 11, further comprising training a convolutional neural network to extract the features.

15. At least one non-transitory computer readable medium for calibrating texture cameras in depth camera systems having instructions stored therein that, in response to being executed on a computing device, cause the computing device to:
- receive a plurality of depth images from an infrared camera and a plurality of color images from a texture camera of a depth camera system; extract features from the plurality of depth images and the plurality of color images;
- detect that the extracted features from the plurality of depth images and the plurality of color images exceed a quality threshold based on a smoothness of depth edges;
- aggregate the extracted features from the plurality of depth images to generate a first aggregated set of extracted features and aggregate the extracted features from the plurality of color images to generate a second aggregated set of extracted features; detect that a misalignment between the first aggregated set of extracted features from the plurality of depth images and the second aggregated set of extracted features from the plurality of color images exceeds a misalignment threshold; and
- modify calibration parameters for the texture camera to reduce the detected misalignment between the first aggregated set of extracted features from the plurality of depth images and the second aggregated set of extracted features from the plurality of color images below the misalignment threshold,
- wherein the calibration parameters are modified by solving an optimization problem comprising the calibration parameters and features extracted from a texture mapping of a color image among the plurality of color images mapped to a depth image among the plurality of depth images.

16. The at least one non-transitory computer readable medium of claim 15, comprising instructions to generate gradient images based on horizontal derivatives and vertical derivatives of the plurality of depth images and the plurality of color images.

17. The at least one non-transitory computer readable medium of claim 15, comprising instructions to detect that the plurality of depth images and the plurality of color images each comprises a number of features that exceeds a threshold number of features.

18. The at least one non-transitory computer readable medium of claim 15, comprising instructions to compare gradient images to determine an amount of misalignment.

19. The apparatus of claim 1, wherein the features extracted from the texture mapping comprise an absolute value of an image gradient.

20. The apparatus of claim 1, wherein the texture mapping comprises a warping of a unit square that maps a domain of the color image to a domain of the depth image.

* * * * *